US009351217B2

(12) United States Patent
Ye

(10) Patent No.: US 9,351,217 B2
(45) Date of Patent: May 24, 2016

(54) METHOD OF PERFORMING TRAFFIC STEERING IN A WIRELESS NETWORK SYSTEM AND RELATED WIRELESS NETWORK SYSTEM

(71) Applicant: ACER INCORPORATED, New Taipei (TW)

(72) Inventor: Shiang-Rung Ye, New Taipei (TW)

(73) Assignee: ACER INCORPORATED, Xizhi Dist., New Taipei (TW)

(*) Notice: Subject to any disclaimer, the term of this patent is extended or adjusted under 35 U.S.C. 154(b) by 0 days.

(21) Appl. No.: 14/470,938

(22) Filed: Aug. 27, 2014

(65) Prior Publication Data

US 2015/0215812 A1  Jul. 30, 2015

Related U.S. Application Data

(60) Provisional application No. 61/932,802, filed on Jan. 29, 2014, provisional application No. 61/939,746, filed on Feb. 14, 2014.

(51) Int. Cl.
*H04W 36/22* (2009.01)
*H04W 28/08* (2009.01)
*H04W 88/06* (2009.01)

(52) U.S. Cl.
CPC .............. *H04W 36/22* (2013.01); *H04W 28/08* (2013.01); *H04W 88/06* (2013.01)

(58) Field of Classification Search
CPC ..... H04W 28/08; H04W 36/22; H04W 16/08; H04W 28/0284; H04W 36/14; H04W 72/085
See application file for complete search history.

(56) References Cited

U.S. PATENT DOCUMENTS

| 8,451,804 | B2* | 5/2013 | Vujcic | .......................... 370/336 |
|---|---|---|---|---|
| 8,743,696 | B2 | 6/2014 | Chowdhury | |
| 9,210,613 | B2 | 12/2015 | Tipton | |
| 2002/0137518 | A1 | 9/2002 | Achour | |
| 2008/0298325 | A1 | 12/2008 | Vujcic | |
| 2010/0255846 | A1 | 10/2010 | Vikberg | |
| 2011/0199905 | A1 | 8/2011 | Pinheiro | |

(Continued)

FOREIGN PATENT DOCUMENTS

WO    2013042330 A1    3/2013

OTHER PUBLICATIONS

Interworking between Next Generation Fixed and 3GPP Wireless Access, SA WG2 Meeting #S2-87, S2-113892, WT-203, Oct. 10-14, 2011, pp. 1-57, Revision: 09, XP050549084, The Broadband Forum, Jeju Island, South Korea.

(Continued)

*Primary Examiner* — Daniel Washburn
*Assistant Examiner* — Eboni Hughes
(74) *Attorney, Agent, or Firm* — Winston Hsu; Scott Margo

(57) ABSTRACT

A wireless network system includes abase station of a first network and a user equipment camping on the first network. The user equipment receives an indicator, a probability value within a predetermined range, and at least one RAN rule from the base station. When the indicator is set to a specific value, the user equipment generates a random value within the predetermined range. When the at least one RAN rule is satisfied and a probability condition associated with the random value and the probability value is fulfilled, the user equipment steers traffic from the first network to a second network or from the second network to the first network.

9 Claims, 3 Drawing Sheets

(56) References Cited

U.S. PATENT DOCUMENTS

| | | |
|---|---|---|
| 2012/0039175 A1 | 2/2012 | Sridhar |
| 2012/0202491 A1 | 8/2012 | Fox |
| 2013/0189991 A1* | 7/2013 | Rose ............... H04W 16/18 455/436 |
| 2013/0242777 A1 | 9/2013 | Choi |
| 2014/0003239 A1* | 1/2014 | Etemad ............ H04W 28/08 370/235 |
| 2014/0133294 A1* | 5/2014 | Horn ............... H04W 28/0247 370/230 |
| 2014/0213277 A1* | 7/2014 | Jang ............... H04W 28/08 455/453 |

OTHER PUBLICATIONS

John L. Tomici et al., Multi-RAT Traffic Offloading Solutions for the Bandwidth Crunch Problem, 2011, XP031880722, IEEE.

* cited by examiner

METHOD OF PERFORMING TRAFFIC STEERING IN A WIRELESS NETWORK SYSTEM AND RELATED WIRELESS NETWORK SYSTEM

CROSS REFERENCE TO RELATED APPLICATIONS

This application claims the benefit of U.S. provisional application No. 61/932,802 filed on 2014 Jan. 29 and U.S. provisional application No. 61/939,746 filed on 2014 Feb. 14.

BACKGROUND OF THE INVENTION

1. Field of the Invention

The present invention is related to a method of performing traffic steering in a wireless network system, and more particularly, to a method of performing high efficient traffic steering in a wireless network system.

2. Description of the Prior Art

With rapid development in technology, a user may easily connect to a network using desktop computers, notebook computers, personal digital assistants (PDAs) or smart phones. As successive generations of operating standards proliferate, a wireless device is sometimes constructed to be operable in conformity with multiple communication standards associated with a single radio communication system-type or multiple communication system-types. For instance, a multi-mode device may provide a user with the capability of communicating with an Internet Protocol (IP)-based radio network and a 3rd Generation Partnership Project (3GPP)-based cellular network.

In a wireless network system, radio access network (RAN) rules associated with interworking between a 3GPP-based network and an IP-based network are included in a system information block (SIB) broadcast by a base station. Based on the RAN rule, a user equipment (UE) may perform traffic steering between the 3GPP-based network and the IP-based network, such as data offloading from the 3GPP-based network to the IP-based network.

In the prior art traffic steering method, massive movement is an undesirable phenomenon when all user equipment camping on the same over-loaded network start to steering traffic from the same network simultaneously. The prior art traffic steering method may cause another network to suddenly become over-loaded and thus requires more traffic steering. Therefore, there is a need for a method of performing high efficient traffic steering in a wireless network system.

SUMMARY OF THE INVENTION

The present invention provides a method of performing traffic steering in a wireless network system having a base station of a first network and a user equipment camping on the first network. The method includes the user equipment receiving an indicator, a probability value within a predetermined range, and at least one RAN rule from the base station; the user equipment generating a first random value within the predetermined range when receiving the indicator set to a specific value; the user equipment determining if the at least one RAN rule is satisfied and if a first probability condition associated with the first random value and the probability value is fulfilled; and the user equipment steering traffic from the first network to a second network or from the second network to the first network when the at least one RAN rule is satisfied and the first probability condition is fulfilled.

The present invention also provides a wireless network system which performs traffic steering. The wireless network system includes a first network including a base station; a second network; and a user equipment currently camping on the first network. The user equipment is configured to receive an indicator, a probability value within a predetermined range, an update amount, a timer length and at least one RAN rule from the base station; generate a random value within the predetermined range and starting a timer when receiving the indicator set to a specific value; determine if the at least one RAN rule is satisfied and if a probability condition associated with the random value and the probability value is fulfilled; steer traffic from the first network to the second network or from the second network to the first network when the at least one RAN rule is satisfied and the probability condition is fulfilled; and adjust the probability value by the update amount after the timer expires according to the timer length when the at least one RAN rule is satisfied but the probability condition is not fulfilled.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
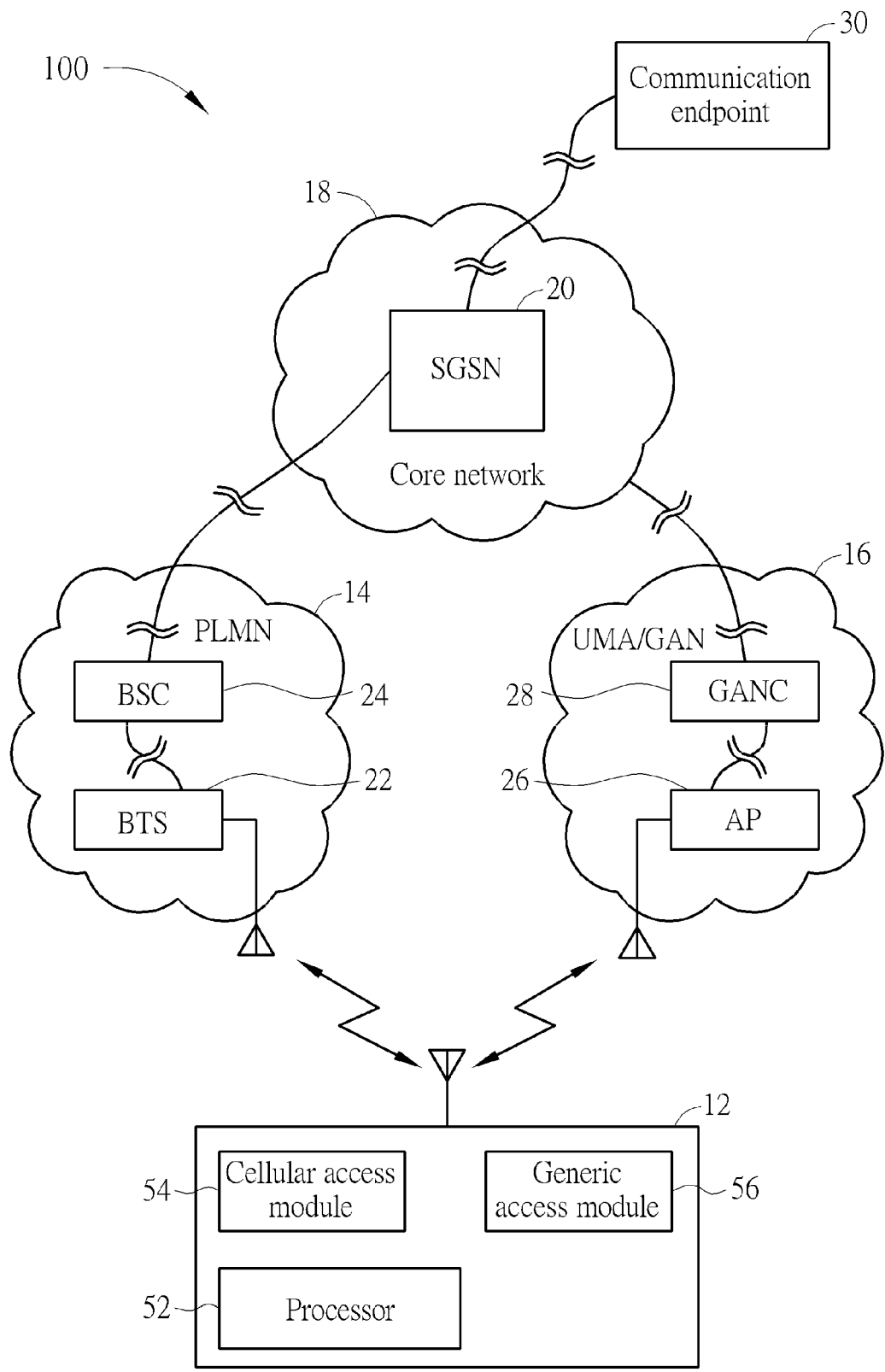
FIG. 1 is a diagram illustrating a wireless network system configured to perform high efficient traffic steering according to an embodiment of the present invention.

FIG. 1 is a diagram illustrating a wireless network system 100 configured to perform high efficient traffic steering according to an embodiment of the present invention. The wireless network system 100 includes one or multiple wireless devices (only one wireless device 12 is shown), a public land mobile network (PLMN) 14 and an unlicensed mobile access/generic access network (UMA/GAN) 16, a core network 18 and a communication endpoint 30. The PLMN 14 may be representative of any 3GPP-based cellular network including, but not limited to, 2G, 2.5G, 3G or 4G network. The UMA/GAN 16 may be representative of any IP-based radio network including, but not limited to, a wireless local area network (WLAN) or a wireless fidelity (Wi-Fi) network.

The PLMN 14 and the UMA/GAN 16 are coupled in communication connectivity by way of the core network 18. The core network 18 includes a serving general packet radio service support node (SGSN) 20 which is responsible for the delivery of data packets from and to the wireless devices within its geographical service area. In conformity with the 3GPP network structure, the PLMN 14 is shown to include a base transceiver station (BTS) 22 and a base station controller (BSC) 24, while the UMA/GAN 16 is shown to include an access point (AP) 26 and a GAN controller (GANC) 28, also sometimes referred to as a UMA/GAN network controller (UNC). Noteworthily, the 2G-based BTS 22 and the BSC 24 may be substituted by their 3G-based equivalences of a NODE B and a radio network controller (RNC), respectively, or by their 4G-based equivalence of an e-NODE B. The communication endpoint 30 may be representative of any of various data destinations forming communication nodes used in performance of a communication service.

The user equipment 12 includes a processor 52, a cellular access module 54 and a generic access module 56. The user equipment 12 may register on the PLMN 14 using the cellular access module 54 and/or register on the UMA/GAN 16 using the generic access module 56, thereby providing dual-mode operation. Also, the processor 52 is configured to control data loading between the PLMN 14 and the cellular access module 54 and between the UMA/GAN 16 and the generic access module 56 according to one or multiple RAN rules received from the PLMN 14 or the UMA/GAN 16. The detailed operation of the user equipment 12 when performing the present traffic steering method will be described in subsequent paragraphs.

In the present invention, the wireless device 12 or the communication endpoint 30 may include multi-mode transportable electronic devices such as mobile telephones, personal digital assistants, handheld, tablet, nettop, or laptop computers, or other devices with similar telecommunication and interworking capabilities. In other cases, the wireless device 12 or the communication endpoint 30 may include multi-mode non-transportable devices with similar telecommunications and interworking capabilities, such as desktop computers, set-top boxes, or network appliances. The PLMN 14 and the UMA/GAN 16 are configured to provide local coverage (an area where the wireless device 12 or the communication endpoint 30 can work) for the wireless network system 100. However, the types of the wireless device 12, the communication endpoint 30, the PLMN 14 and the UMA/GAN 16 do not limit the scope of the present invention.

Figure 2:
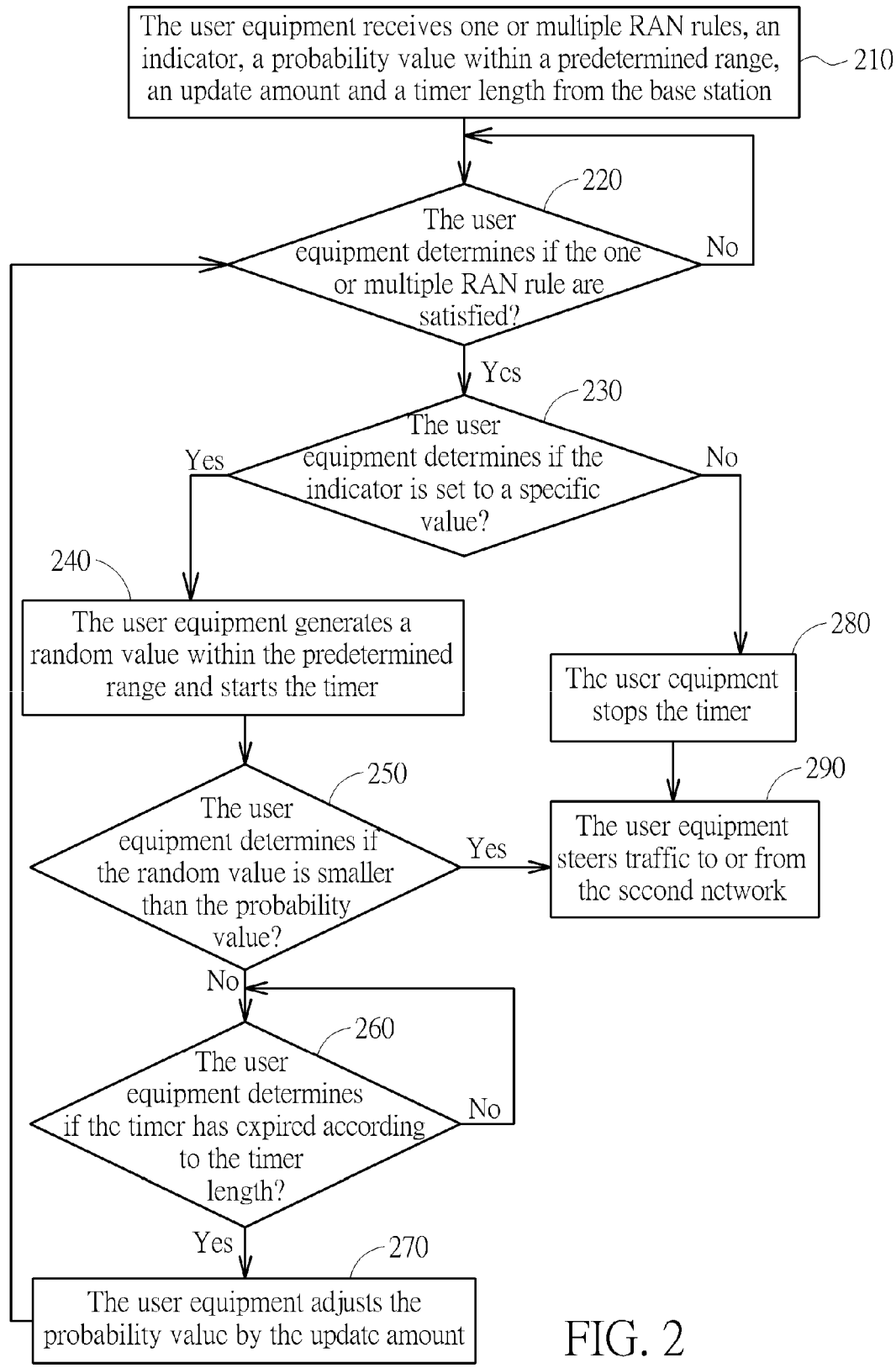
FIGS. 2 and 3 are flowcharts illustrating methods of performing high efficient traffic steering in a wireless network system according to embodiments of the present invention.
Figure 3:
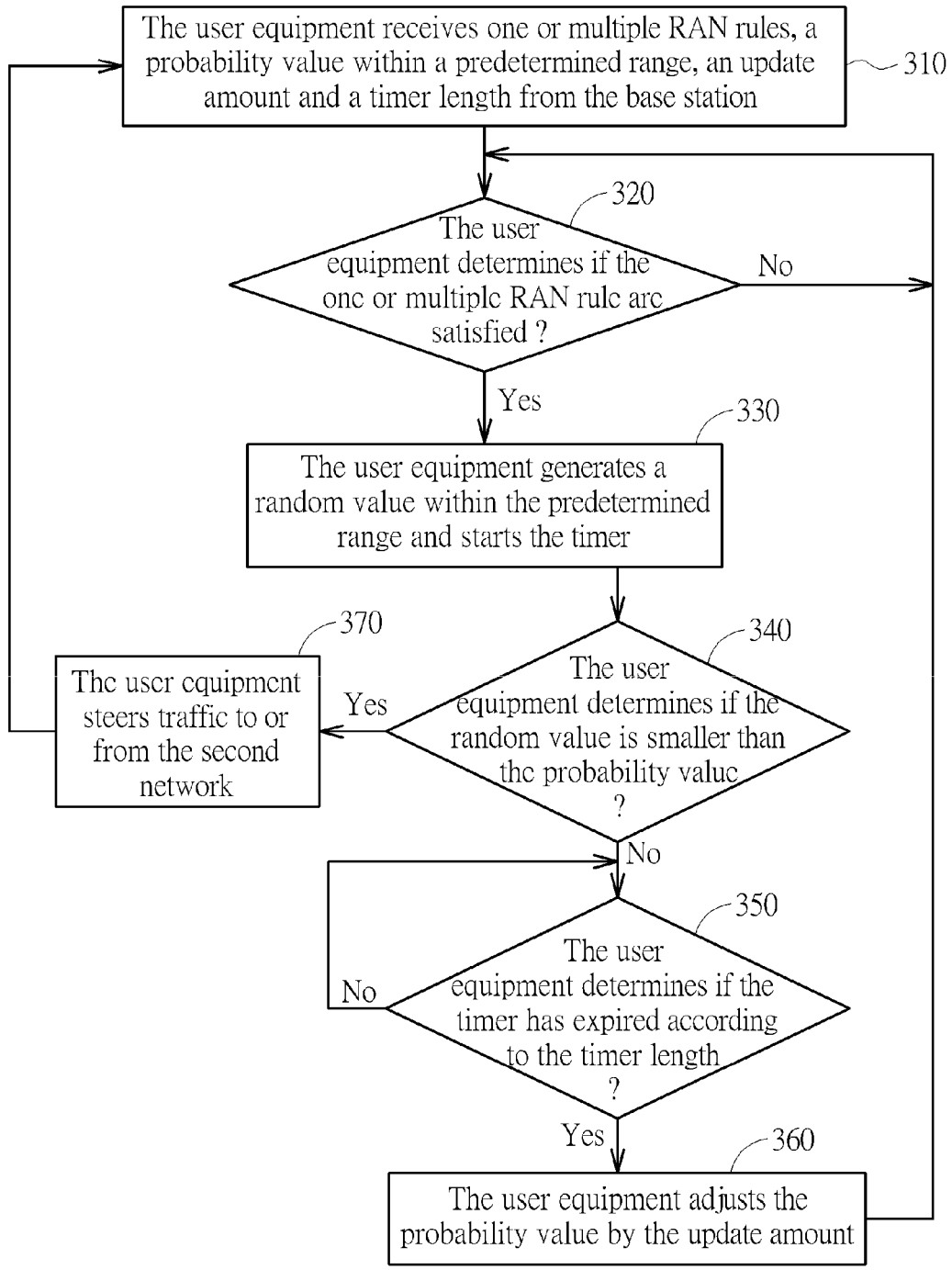

FIGS. 2 and 3 are flowcharts illustrating methods of performing high efficient traffic steering in a wireless network system according to embodiments of the present invention. FIGS. 2 and 3 illustrate the operation of a base station and a user equipment in the wireless network system 100. The base station may be a 2G-based BTS, a 3G-based NODE B or a 4G-based e-NODE B in the 3GPP-based PLMN 14, or the IP-based UMA/GAN 16. The user equipment may be the multi-mode wireless device 12 capable of registering on at least a first network and a second network and is currently camping on the first network. The first network may be the 3GPP-based PLMN 14 and the second network may be the IP-based UMA/GAN 16, or vice versa.

The method depicted in FIG. 2 includes the following steps:

Step 210: the user equipment receives one or multiple RAN rules, an indicator, a probability value within a predetermined range, an update amount and a timer length from the base station; execute step 220.

Step 220: the user equipment determines if the one or multiple RAN rule are satisfied; if yes, execute step 230; if no, execute step 220.

Step 230: the user equipment determines if the indicator is set to a specific value; if yes, execute step 240; if no, execute step 280.

Step 240: the user equipment generates a random value within the predetermined range and starts the timer; execute step 250.

Step 250: the user equipment determines if the random value is smaller than the probability value; if yes, execute step 290; if no, execute step 260.

Step 260: the user equipment determines if the timer has expired according to the timer length; if yes, execute step 270; if no, execute step 260.

Step 270: the user equipment adjusts the probability value by the update amount; execute step 220.

Step 280: the user equipment stops the timer; execute step 290.

Step 290: the user equipment steers traffic to or from the second network; execute step 210.

In step 210, the user equipment is configured to receive one or multiple RAN rules with one or multiple thresholds, the indicator, the probability value, the update amount and the timer length from the base station. Each RAN rule may be associated with parameters used to evaluate the signal quality of the first network which the user equipment is currently camping on, such as RSRP (reference signal receiving power), RSRQ (reference signal receiving quality), CPICH RSCP (common pilot channel received signal code power), CPICH EC/No (common pilot channel energy per chip over the noise), RSSI (received signal strength indicator), RCPI (received channel power indicator), or BSS (basic service set) load.

Some examples of the one or multiple RAN rules in step 210 are shown following this paragraph. $M_{RSRP}$ and $M_{RSSI}$ represent the RSRP and RSSI measured by the user equipment when camping on the first network. $T_1$-$T_4$ represent the thresholds received from the base station. However, the type and number of the RAN rule do not limit the scope of the present invention.

Example 1: $M_{RSRP} > T_1$
Example 2: $M_{RSRP} > T_1$ and $M_{RSSI} > T_2$
Example 3: $M_{RSRP} < T_3$ or $M_{RSSI} < T_4$ In the present invention, the one or multiple RAN rules, the indicator, the probability value, the update amount and the timer length may be transmitted via dedicated or broadcast signaling, such as via radio resource control (RRC) messages, paging messages, master information blocks (MIBs) or SIBs, separately to together. In an embodiment, the one or multiple RAN rules, the indicator, the probability value, the update amount and the timer length may be included in the same paging message. In another embodiment, the indicator, the update amount and the timer length may be included in the same RRC massage or the same paging message, while the one or multiple RAN rules may be included in an MIB or an SIB. However, the method of transmitting the one or multiple RAN rules, the indicator, the probability value, the update amount and the timer length does not limit the scope of the present invention.

In an embodiment of the present invention, each indicator includes at least one bit. The indicator set to the specific value (such as logic 1) means that the user equipment should steer traffic based on both the one or multiple RAN rules and a probability condition. The indicator set to another value (such as logic 0) means that the user equipment should steer traffic based on the one or multiple RAN rules. Corresponding operations of the user equipment will be described in detail in subsequent paragraphs.

For illustrative purpose, assume that the user equipment only receives one RAN rule and the indicator set to the specific value from the base station in step 210. After determining that the one or multiple RAN rule are satisfied in step 220 and determining that the indicator is set to the first value in step 230, the user equipment is configured to generate the random value and start the timer in step 240. Note that the timer may or may not be running when the user equipment generates the random value in step 240.

In step 240, the random value is generated within the same predetermined range as the probability value received from the base station. The probability value is used to decide the chance of performing traffic steering when the one or multiple RAN rules are satisfied. The probability condition is considered to be fulfilled when the random value is smaller than the probability value. When two user equipment both determine that the one or multiple RAN rule are satisfied, the user equipment having a larger probability value is more likely to performing immediate traffic steering, as will be described in more detail in subsequent paragraphs.

If it is determined in step 250 that the random value is smaller than the probability value, the user equipment is configured to steer traffic from the first network to the second network or from the second network to the first network in step 290. If it is determined in step 250 that the random value is not smaller than the probability value, the user equipment is configured to periodically adjust the probability value by the update amount in steps 270 and 280.

Assume that a first user equipment and a second user equipment receive the same information from the base station in step 210, wherein the probability value is set to 50 within the predetermined range of 1-100 and the indicator is set to the specific value. When the one or multiple RAN rules are satisfied, the first user equipment generates a random value R1 and the second user equipment generates a random value R2 in step 240, wherein R1 and R2 may be any value between 1 and 100. Statistically speaking, there is equal chance for the randomly generated R1 or R2 to be smaller than 50. Assuming that R1<50 and R2>50, only the first user equipment starts to perform traffic steering in step 290.

On the other hand, the second user equipment waits for the timer to expire before adjusting the probability value by the update amount. For example, the probability value may be adjusted from 50 to 60. Next time when the RAN rule is satisfied, the second user equipment generates another random value R2' in step 240, wherein R2' may be any value between 1 and 100. Statistically speaking, there is higher chance for the randomly generated R2' to be smaller than the updated probability value of 60. If the randomly generated R2' is smaller than the updated probability value of 60, the second user equipment can start to perform traffic steering in step 290; if the randomly generated R2' is still not smaller than the updated probability value of 60, the second user equipment adjusts the probability value by the update amount in steps 260 and 270. For example, the probability value may be adjusted from 60 to 70, thereby increasing the chance of performing immediate traffic steering. If the second user equipment keeps generating random values smaller than previously adjusted probability values, the adjusted probability value would eventually reach 100 after performing steps 260 and 270 several times, thereby allowing the second user equipment to perform traffic steering in step 290.

The method depicted in FIG. 3 includes the following steps:

Step 310: the user equipment receives one or multiple RAN rules, a probability value within a predetermined range, an update amount and a timer length from the base station; execute step 320.

Step 320: the user equipment determines if the one or multiple RAN rule are satisfied; if yes, execute step 330; if no, execute step 320.

Step 330: the user equipment generates a random value within the predetermined range and starts the timer; execute step 340.

Step 340: the user equipment determines if the random value is smaller than the probability value; if yes, execute step 370; if no, execute step 350.

Step 350: the user equipment determines if the timer has expired according to the timer length; if yes, execute step 360; if no, execute step 350.

Step 360: the user equipment adjusts the probability value by the update amount; execute step 320.

Step 370: the user equipment steers traffic to or from the second network; execute step 310.

The methods illustrated in FIGS. 2 and 3 are similar except the use of the indicator. In FIG. 2, the indicator is used to control whether the user equipment should adjust the probability value after failing to generate the random value smaller than the current probability value; in FIG. 3, the user equipment always adjusts the probability value after failing to generate the random value smaller than the current probability value.

The present invention may be applied to a user equipment operating in the idle mode (currently camping on a specific cell) or operating in the connected mode (currently connected to a specific network). However, the operational mode of the user equipment does not limit the scope of the present invention.

In the present invention, when there are multiple user equipment qualified to perform traffic steering, the introduction of the probability value only allows a certain number of user equipment to steer traffic immediately, while other user equipment need to wait until the probability condition is fulfilled with an adjusted probability value. Therefore, the present invention can solve the undesirable massive movement, thereby providing a method of performing high efficient traffic steering in a wireless network system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing traffic steering in a wireless network system having a base station of a first network and a user equipment camping on the first network, comprising:

the user equipment receiving a probability value within a predetermined range, and at least one radio access network (RAN) rule from the base station;

the user equipment receiving an update amount and a timer length from the base station;

the user equipment generating a first random value within the predetermined range and starting a timer;

the user equipment determining if the at least one RAN rule is satisfied and if a first probability condition associated with the first random value and the probability value is fulfilled;

the user equipment steering traffic from the first network to a second network or from the second network to the first network when the at least one RAN rule is satisfied and the first probability condition is fulfilled;

the user equipment adjusting the probability value by the update amount from a first value to a second value after the timer expires according to the timer length when the at least one RAN rule is satisfied but the first probability condition is not fulfilled;

the user equipment generating a second random value within the predetermined range; and the user equipment steering traffic from the first network to the second network or from the second network to the first network when the first RAN rule is satisfied and a second probability condition associated with the second random value and the adjusted probability value is fulfilled.

2. The method of claim 1, wherein the first probability condition is fulfilled when the first random value is smaller than the probability value.

3. The method of claim 1, wherein:
the second value is larger than the first value; and
the second probability condition is fulfilled when the second random value is smaller than the adjusted probability value.

4. The method of claim 1, wherein all of the probability value, the update amount, the timer length and the at least one RAN rule are transmitted via a radio resource control (RRC) message, a paging message, a master information block (MIB), or a system information block (SIB).

5. The method of claim 1, wherein:
the probability value, the update amount and the timer length are transmitted via an RRC message or a paging message; and
the at least one RAN rule is transmitted via an MIB or an SIB.

6. The method of claim 1, wherein the at least one RAN rule is associated with a reference signal receiving power (RSRP), a reference signal receiving quality (RSRQ), a common pilot channel received signal code power (CPICH RSCP), a common pilot channel energy per chip over the noise (CPICH EC/No), a received signal strength indicator (RSSI), a received channel power indicator (RCPI), or a basic service set (BSS) load measured by the user equipment.

7. The method of claim 1, further comprising:
the user equipment receiving an indicator from the base station;
the user equipment stopping the timer and steering traffic from the first network to the second network or from the second network to the first network when the at least one RAN rule is satisfied and the indicator is not set to a specific value, wherein the first random value within the predetermined range is generated when the indicator is set to the specific value.

8. A wireless network system which performs traffic steering, comprising:
a first network including a base station;
a second network; and
a user equipment currently camping on the first network and configured to:
receive a probability value within a predetermined range, an update amount, a timer length and at least one RAN rule from the base station;
generate a random value within the predetermined range and a start timer;
determine if the at least one RAN rule is satisfied and if a first probability condition associated with the random value and the probability value is fulfilled;
steer traffic from the first network to the second network or from the second network to the first network when the at least one RAN rule is satisfied and the first probability condition is fulfilled;
adjust the probability value by the update amount after the timer expires according to the timer length when the at least one RAN rule is satisfied but the first probability condition is not fulfilled;
generate a second random value within the predetermined range; and
steer traffic from the first network to the second network or from the second network to the first network when the at least one RAN rule is satisfied and a second probability condition associated with the second random value and the adjusted probability value is fulfilled.

9. The wireless network system of claim 8, wherein the first network is a 3rd Generation Partnership Project (3GPP)-based cellular network and the second network is an Internet Protocol (IP)-based radio network.

* * * * *